United States Patent [19]

Cole

[11] E Patent Number: Re. 33,612

[45] Reissued Date of Patent: Jun. 18, 1991

[54] ICE MAKER SYSTEM

[76] Inventor: Ronald E. Cole, 933 Sleepy Hollow Pl., Greenwood, Ind. 46142

[21] Appl. No.: 259,961

[22] Filed: Oct. 19, 1988

Related U.S. Patent Documents

Reissue of:

[64] Patent No.: 4,697,432
Issued: Oct. 6, 1987
Appl. No.: 888,875
Filed: Jul. 24, 1986

[51] Int. Cl.[5] ..... F25C 5/04

[52] U.S. Cl. ..... 62/233; 62/353; 74/437

[58] Field of Search ..... 62/233, 353; 74/393, 74/437

[56] References Cited

U.S. PATENT DOCUMENTS

| | | | |
|---|---|---|---|
| 2,552,572 | 5/1951 | Mikina | 74/437 X |
| 2,700,285 | 1/1955 | Bellini | 74/437 X |
| 2,717,497 | 9/1955 | Knerr | 62/353 X |
| 2,844,008 | 7/1958 | Barton | 62/353 X |
| 2,957,363 | 10/1960 | Ingham et al. | 74/437 |
| 3,217,510 | 11/1965 | Kniffin et al. | 62/353 |
| 3,254,505 | 6/1966 | De Turk | 62/353 |
| 3,299,656 | 1/1967 | Linstromberg et al. | 62/233 |
| 3,613,470 | 10/1971 | Arawana | 74/393 |

*Primary Examiner*—William E. Tapolcai

[57] ABSTRACT

A timing mechanism controls various functions of an ice maker through cams carried on a camshaft. A harvest rake that removes ice from a receptacle is coupled to the camshaft to be rotated thereby. The camshaft is driven by a motor which is coupled to the timing mechanism through a pair of non-circular meshing gears. The gears are programmed such that a slower speed is imparted to the camshaft when ice is being removed from the receptacle by the harvest rake. This provides a slower speed but higher torque to the harvest rake during ice removal and a faster, more accurate timing rate during filling of the receptacle.

4 Claims, 2 Drawing Sheets

ICE MAKER SYSTEM

Matter enclosed in heavy brackets [ ] appears in the original patent but forms no part of this reissue specification; matter printed in italics indicates the additions made by reissue.

BACKGROUND OF THE INVENTION

The present invention relates to an ice maker system for refrigerators and more particularly to such a system wherein a harvest rake is driven at a variable speed.

Ice maker systems have been used in refrigerators for many years. In such systems, a timing mechanism and a harvest rake are driven by a motor. The timing mechanism controls the on-off time of the system, heat to the system and other related functions while the harvest rake is rotated to remove ice from the ice maker.

In accordance with the present invention, a variable speed is imparted to the harvest rake such that a slower speed is applied during ice removal and higher speed during liquid filling of the ice maker. This provides a higher torque to the rake during ice removal and a faster more accurate timing during filling.

SUMMARY OF THE INVENTION

Accordingly, the present invention relates to a timed drive means for an ice making system which comprises cam means and switch means operated by the cam means, a motor, and coupling means coupling the motor to the cam means to operate same, including a pair of meshing gears at least one of which is non-circular, the meshing gears programmed to apply a first speed to the cam means during ice removal and a second faster speed during liquid filling of the ice making system.

DETAILED DESCRIPTION OF THE INVENTION

Figure 1:
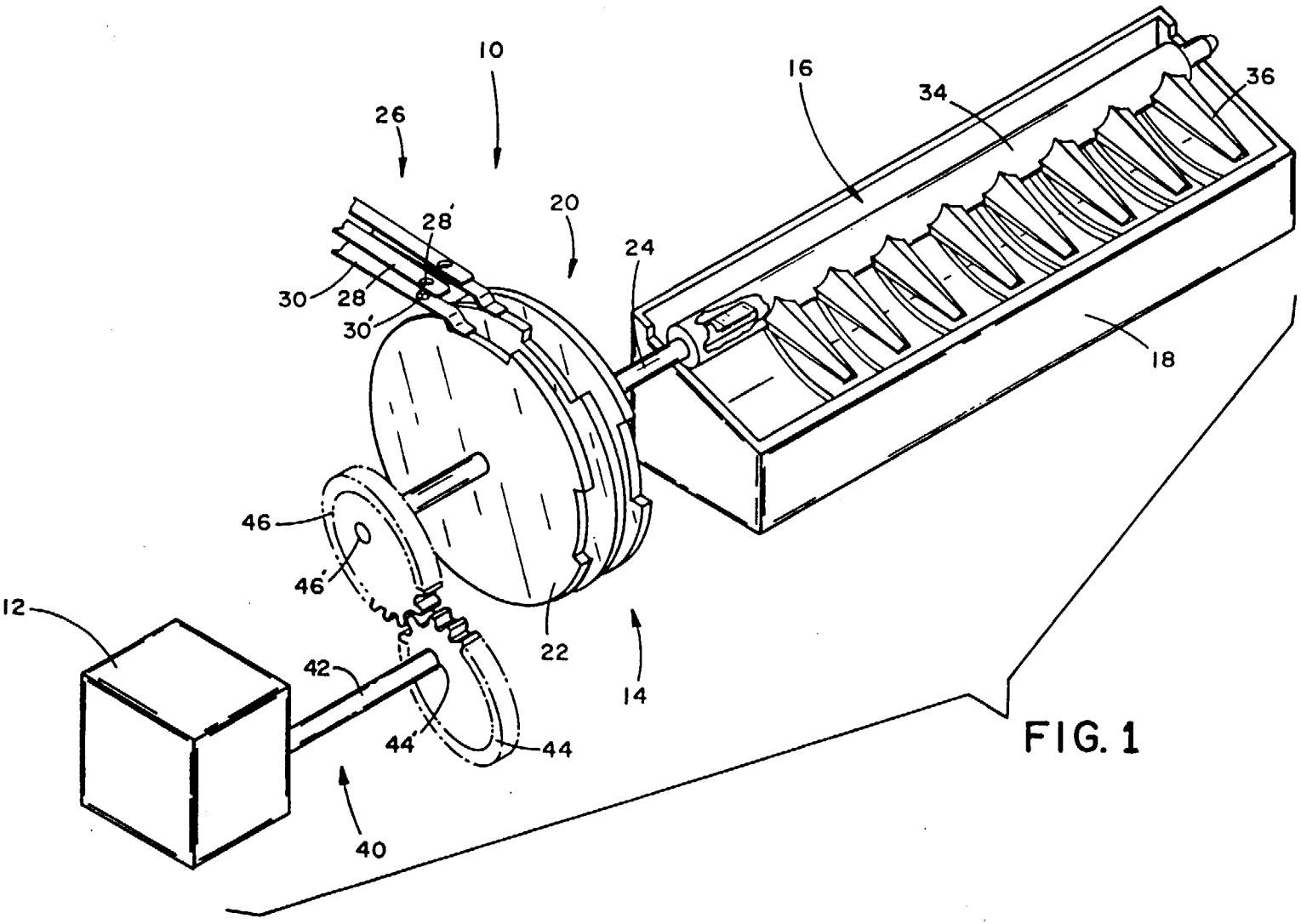
FIG. 1 is an exploded, schematic view of an ice making system.

Referring now to the drawing, there is shown an ice maker system 10 employing the features of the invention. The ice maker system includes a motor 12 which drives a timing mechanism 14, a harvest rake 16, and a liquid receptacle 18. Motor 12 may be of the synchronous type and may include a gear train to provide a desired gear reduction. Timing mechanism 14 includes a cam means 20 which includes a series of cams 22 carried on a camshaft 24, and switch means 26. Switch means 26 includes a series of upper and lower electrical contact blades 28 and 30, one of which engages the cams. Rotation of the cams causes the cams to open and close electrical contacts 28' and 30'. The opening and closing of the electrical contacts opens and closes electrical circuits to control such functions as turning motor 12 on and off, controlling a thermostat, etc. in a manner well known in the art. Harvest rake 16 includes a rod 34 and teeth 36 extending from the rod. The rod can be connected to camshaft 24 by some suitable means or alternatively shaft 24 and the rod could be of a one piece construction. Thus the harvest rake rotates with camshaft 24.

In accordance with the present invention, a variable speed is imparted to harvest rake 16. This is accomplished through coupling means 40 which couples motor 12 to camshaft 24. Coupling means 40 includes a motor output shaft 42 and a pair of meshing gears 44 and 46. Gear 44 is fixedly carried on shaft 42 to be rotated therewith. Gear 46 is fixedly carried on camshaft 24 such that the camshaft is rotated in accordance with the gear. As shown, each of the gears 44 and 46 are non-circular. In the present embodiment, each of the gears are elliptical with their centers of rotation being at one of the foci 44', 46' of their respective ellipse. The gears are programmed with respect to each other such that a slower camshaft speed of rotation is generated when harvest rake 16 is removing ice from the receptacle.

Figure 2:
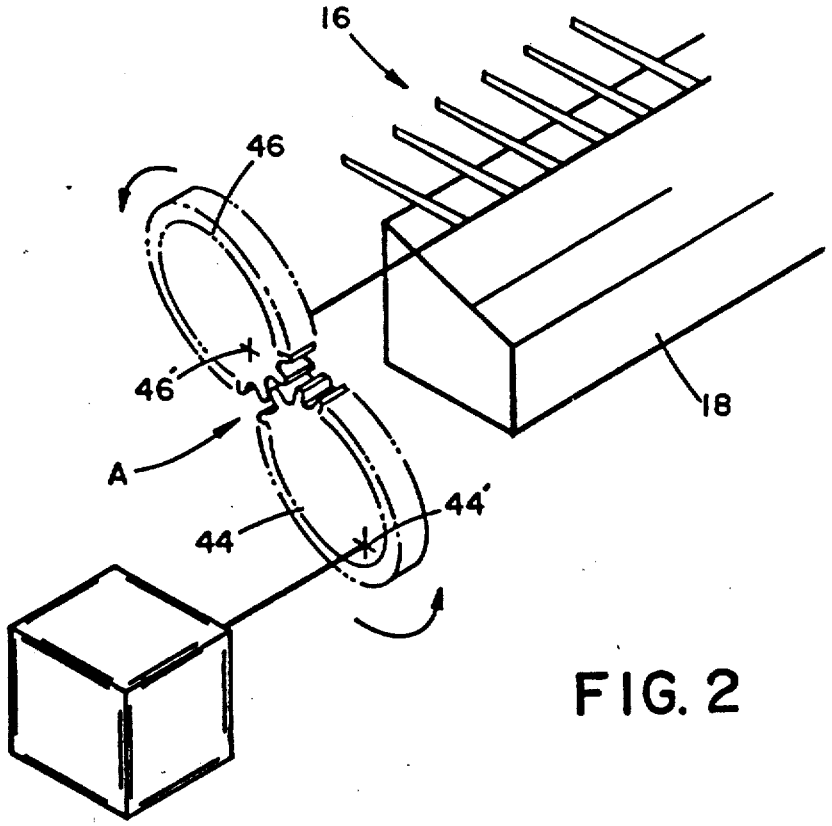

Referring to FIG. 2, the operating mode of the gears are shown when rake 16 is in the position when receptacle 18 is being filled with liquid. The gears are shown at the position at or near the fastest speed being applied to the rake. As shown, foci 44' is at its furthest point from the area A where the gears mesh while foci 46' is at its closest point to area A.

Figure 3:
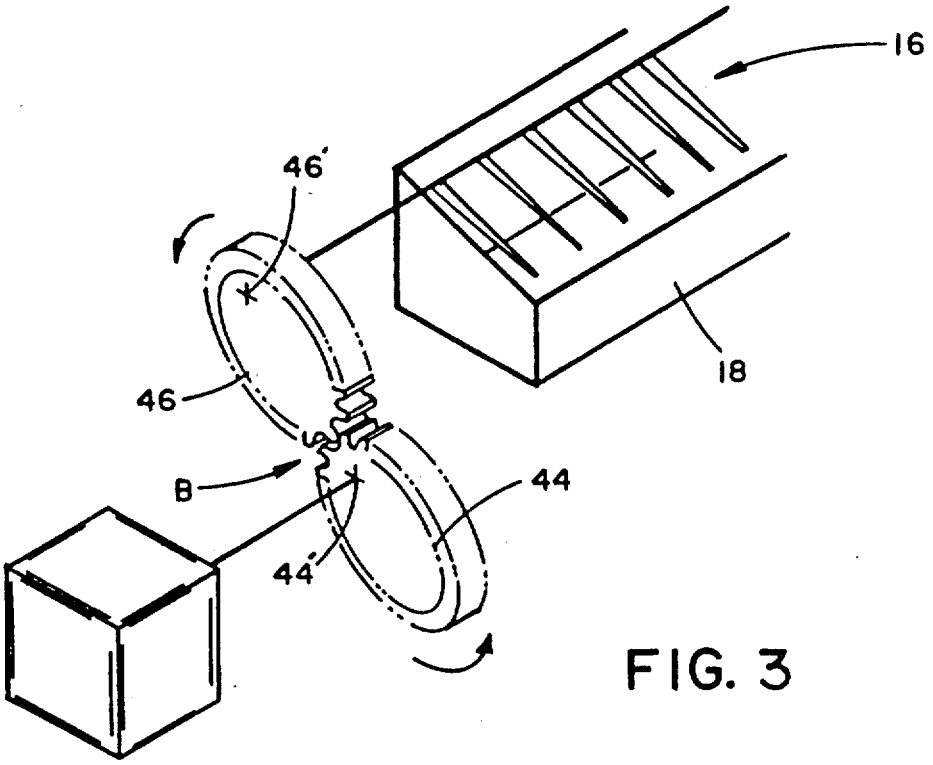
FIGS. 2 and 3 are schematics showing two operating modes.

In FIG. 3, the operating mode of the gears are shown when rake 16 is removing ice from receptacle 18. The gears are shown at or near the position of slowest speed with highest torque being applied to the rake. As shown, foci 44' is at its closest point to gear meshing area B while foci 46' is at its furthest point from gear meshing area B.

Actual filling and removal may occur at positions slightly removed from the positions shown in FIGS. 2 and 3, however, the benefits of the gearing system are still realized.

What is claimed is:

1. A timed drive means for an ice making system comprising:

cam means and switch means operated by said cam means, ice removal means, a motor, and coupling means coupling said motor to said ice removal means to operate same, including a motor output shaft connected to a first elliptical gear through a first foci of same, and a second elliptical gear meshing with said first elliptical gear and connected to said ice removal means through a second foci of same, said first and second elliptical gears programmed such that said first foci is toward the area where they mesh, and said second foci is away from said area during ice removal, and said first foci is away from said area and said second foci is toward said area during liquid filling of said ice making system.

*2. A drive means for an ice making system comprising:*

*cam means and switch means operated by said cam means;*

*ice removal means;*

*means for driving said ice removal means at a first speed during ice removal; and*

*said driving means driving said ice removal means at a second speed during liquid filling of the ice making system;*

*said second speed being faster than said first speed to provide faster, more accurate timing of the operation of the system during filling.*

*3. An ice making system comprising:*

*tray means for holding water while it is being frozen into ice;*

*rake means for mechanically removing said ice from said tray means; and*

*drive means for moving said rake from an initial position, through an ice removing range in which it removes ice from said tray means, and thereafter returning it to said initial position, said drive means including means for driving said rake means at a first non-zero speed when it is removing said ice from said tray means and at a second non-zero speed when it is*

*being returned to said initial position, said second speed being faster than said first speed.*

*4. An ice making system comprising:*

*tray means for holding water while it is being frozen into ice;*

*cam means and switch means operated by said cam means;*

*ice removal means; and* drive means for driving said cam means and said ice removal means at a first non-*zero speed during ice removal and a second non-zero speed during at least a portion of the time that ice is not being removed, said second speed being faster than said first speed.*

* * * * *